United States Patent [19]
Pizzolo et al.

[11] Patent Number: 5,636,469
[45] Date of Patent: Jun. 10, 1997

[54] FISHING TACKLE APPARATUS

[76] Inventors: Frank R. Pizzolo, 3155 Schley Ave.; Salvatore A. Pizzolo, 289 Balcom Ave., both of Bronx, N.Y. 10465

[21] Appl. No.: 690,937

[22] Filed: Aug. 1, 1996

[51] Int. Cl.⁶ .................. A01K 97/04; A01K 97/06
[52] U.S. Cl. .................. 43/54.1; 206/315.11; 43/55; 232/43.2
[58] Field of Search ............... 43/54.1, 55, 57.1, 43/56; 224/920; 232/43.2, 43.1; 206/315.11

[56] References Cited

U.S. PATENT DOCUMENTS

| | | | |
|---|---|---|---|
| 232,680 | 9/1880 | Cammann | 217/47 |
| 2,153,549 | 4/1939 | Cooper | 43/54.1 |
| 2,800,741 | 7/1957 | Adams | 43/56 |
| 3,399,939 | 9/1968 | Anderson | 206/315.11 |
| 4,081,101 | 3/1978 | West | 220/23.4 |
| 4,128,170 | 12/1978 | Elliott | 43/54.1 |
| 4,555,862 | 12/1985 | Panasewich | 43/54.1 |
| 4,640,039 | 2/1987 | O'Neill | 43/54.1 |
| 4,648,121 | 3/1987 | Lowe | 224/259 |
| 4,671,008 | 6/1987 | Lindemood | 43/54.1 |
| 4,691,469 | 9/1987 | Alsobrook et al. | 43/54.1 |
| 4,784,304 | 11/1988 | Schweitzer | 224/920 |
| 4,846,076 | 7/1989 | Menges, Sr. et al. | 108/42 |
| 4,940,173 | 7/1990 | Jacober | 224/153 |
| 5,212,902 | 5/1993 | Moorhead et al. | 43/55 |
| 5,275,316 | 1/1994 | Kish | 224/584 |
| 5,303,500 | 4/1994 | Luukonen | 43/54.1 |
| 5,305,544 | 4/1994 | Testa | 43/54.1 |

*Primary Examiner*—Jeanne Elpel
*Attorney, Agent, or Firm*—Terrance L. Siemens

[57] ABSTRACT

A fishing tackle box includes a rigid housing provided with a cutting board top wall from which depend, a pair of laterally spaced apart storage sub units each equipped with a plurality of horizontally displaceable drawers. Variation in the height of the numerous drawers permits accommodating the myriad sizes of fishing tackle while partitions in any of the drawers assures isolation of the specific tackle items. A single lock element on each sub unit is shiftable to a drawer overlying position to maintain closed drawers in place. Live bait or fish catch is retained within a waterproof receptacle removably positioned beneath the housing top wall intermediate the two storage sub units and is accessible through a pivotal door in the top wall. A fixed tape measure as well as an adjacent extensible measuring tape are included in the top wall as are flexible VELCRO straps operable to securely attach elongated fishing gear to the housing. To readily store a cleaning knife, a slot is formed through the top wall, juxtaposed one end thereof. The housing may be carried either by gripping two displaceable handles on the front and rear of the top wall or, by grasping extensions at each end of the top wall.

13 Claims, 2 Drawing Sheets

FISHING TACKLE APPARATUS

BACKGROUND OF THE INVENTION

1. Field of the Invention

This invention relates generally to multi function receptacles and more particularly, to an improved apparatus especially constructed to accommodate various fishing tackle items.

2. Description of the Prior Art

The variations of known so called tackle boxes as employed by fishermen are practically endless. Every sport or recreational fisherman utilizes one or more container devices to house and provide transport for the myriad of accouterments felt to be indispensable in the furtherance of their chosen sport. The difficulty in arriving at the most ideal tackle box is compounded by the diversity of equipment most all fishermen find necessary. Included, of course, are fishing rods together with a bait container, fish cleaning tool, hooks, sinkers, line, floats, leaders and lures, just to mention the most obvious. Five gallon plastic buckets or pails have become a basic catch all device when one does not have a more orderly means of storing and transporting their fishing gear. Such buckets are readily obtainable when nothing else more acceptable is at hand as these buckets are used in the shipping of spackling compound as used in finishing drywall joints and may be had, usually at no cost, wherever building construction or renovation is underway. Of course, a mere bucket falls far short of providing a convenient, orderly tackle box as all of a fisherman's gear is just tossed into such a container and subsequent use may actually prove dangerous as one gropes through the tackle therein to locate a particular snelled hook, for example.

Thus, a single unitary apparatus providing ready storage of a multitude of tackle items is a highly desirable device and ideally should provide for or accommodate various other peripheral items such as fish cleaner, measurer and bait or fish catch receptacle, with each defined as a separate but integral portion of the unitary apparatus.

An example of a multi function carrier will be found in U.S. Pat. No. 4,648,121 issued Mar. 3, 1987 to Lowe and which defines a backpack including an alternative exterior pocket as well as external loops or straps for the attachment of diverse items thereto, while a single removable inner bag is offered and which completely fills the interior of an external bag. This patented device differs from the instant invention wherein a unitary rigid assembly includes a plurality of vertically stacked, individual compartments serving to isolate diverse fishing tackle items, in combination with a horizontally removable waterproof receptacle.

U.S. Pat. No. 4,691,469 issued to Alsobrook et al. on Sep. 8, 1987 is directed to a fishing tackle apparatus per se and illustrates a bag device of soft construction having removable and rollable components for the storage of various tackle elements and includes VELCRO strips for securing the rolled components. This is unlike the present invention wherein a rigid or hardened apparatus includes removable or displaceable rigid components arranged to more positively separate tackle items and retain them in a most orderly and isolated manner.

Another backpack device is shown in U.S. Pat. No. 4,940,173 issued Jul. 10, 1990 to Jacober and which comprises a softpack having various alternate zippered compartments serving to accommodate an insulated container. This is contrary to the current invention wherein a hardened apparatus having rigidly constructed, stacked compartments are combined with a sheathed receptacle for a fish cleaning knife, together with several additional components specifically arranged for use by fishermen.

U.S. Pat. No. 5,275,316 issued to Kish on Jan. 4, 1994 relates to a further backpack intended for use by fishermen and includes a rigid frame supporting soft fabric and having a plurality of individual compartments, with the frame including a pivotal leg allowing of support of the backpack upon the ground. This arrangement differs from the present invention wherein an allrigid construction offers a plurality of stacked compartments allowing for the isolated, sorted storage of diverse fishing gear, in combination with a waterproof bait or fish receptacle and other tackle devices.

U.S. Pat. Nos. 5,303,500 and 5,305,544 issued respectively to Luukonen and Testa, Jr. on Apr. 19, 1994 and Apr. 26, 1994 disclose examples of hardened fishing tackle devices. In Luukonen, a bucket is modified to include an exteriorly attached apron providing slots or pockets to loosely accommodate various tackle elements while a plurality of compartmented circular trays are disposed within the confines of the bucket to receive hooks and the like. In the case of the Testa, Jr. apparatus, a cooler chest like device is partitioned to provide a wet side capable of serving as a live bait section while a measuring scale is formed on the removable top cover. Neither of the above devices offer the plurality of stacked, slidable compartments of the instant apparatus nor include a separate, removable bait/catch receptacle.

None of the above inventions and patents, taken either singly or in any combination, is seen to even remotely suggest or describe the instant invention as claimed herein.

SUMMARY OF THE INVENTION

The fisherman's accessory of the present invention provides a portable tackle box or the like which is constructed to provide a hardened, unitary apparatus offering a plurality of separate, stacked compartments, each rectilinearly displaceable to allow selected access to individual receptacles adapted to contain sorted fishing paraphernalia in a protected manner. Preferably, the apparatus comprises two laterally spaced apart vertical arrays of stacked slidable storage drawers, joined together with an overlying top wall defining a cutting board upon which a fisherman's catch may be cleaned. A common lock element on each vertical array precludes unwanted opening of the storage drawers, such as when the apparatus is being transported or, in a pitching boat. An opening between the storage arrays accepts a horizontally removable waterproof receptacle which may selectively be used as a live bait well or fish catch basin. Access to this receptacle is had through a pop up lid in the cutting board top of the apparatus. Oversize, elongated elements such as disassembled fishing rods, are readily accommodated by a pair of quick release fastener straps, manipulated to secure the rods upon the top wall while any catch is quickly measured by reference to a stationary measuring strip on the tackle box top. Oversize catches are measured by additionally deploying an extendible measuring tape contained within the top wall.

Accordingly, an object of the present invention is to provide an improved fishing tackle apparatus including a rigid, unitary assembly comprising two laterally spaced apart arrays of vertically stacked slidable storage drawers with an intermediate waterproof receptacle.

Another object of the present invention is to provide an improved fishing tackle apparatus including a hardened tackle box having a plurality of slidable drawers with a gang locking element precluding accidental opening thereof.

A further object of the present invention is to provide an improved fishing tackle apparatus including a hardened case having a plurality of slidable drawers spanned by a top most cutting board including an access door to a waterproof receptacle therebeneath.

Still another object of the present invention is to provide an improved fishing tackle apparatus including a hard box provided with an uppermost cutting board having an access slot serving as a sheath for a fishing cleaning knife.

Another object of the present invention is to provide an improved fishing tackle apparatus including a top most rigid cutting board having a pair of spaced apart flexible securing straps manipulable to securely retain elongated fishing rod elements.

A further object of the present invention is to provide an improved fishing tackle apparatus including an uppermost rigid cutting board having a measuring strip affixed thereto longitudinally adjacent to an extensible measuring tape.

These and other objects of the present invention will become readily apparent upon further review of the following specification and appended claims.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

Similar reference characters designate corresponding parts throughout the several figures of the drawings.

DETAILED DESCRIPTION OF THE PREFERRED EMBODIMENT

Figure 1:
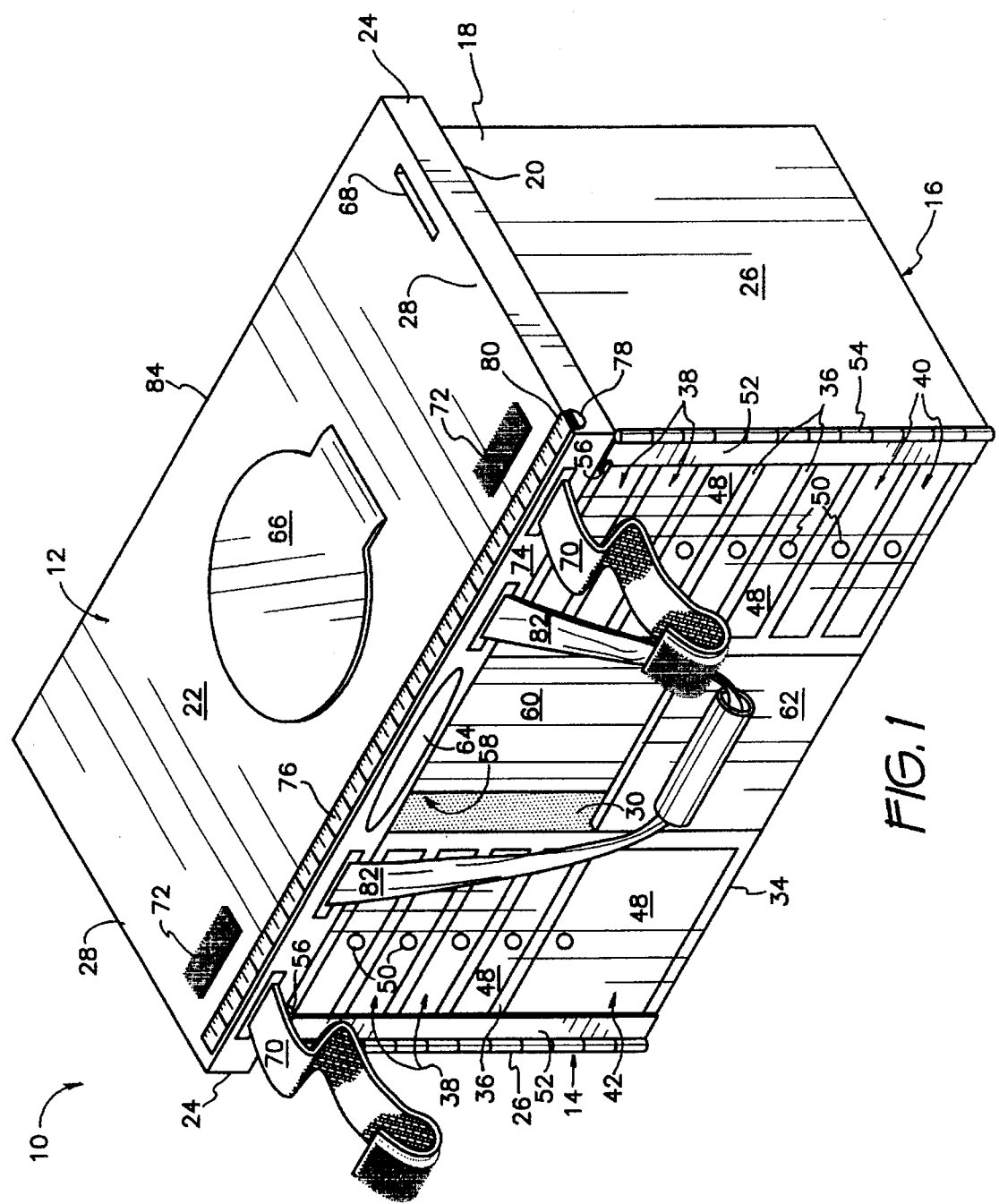
FIG. 1 is a front perspective view of a fishing tackle apparatus according to the present invention.

Referring now to the drawings, particularly FIG. 1, the present invention will be seen to comprise a tackle box or housing, generally designated 10 and which is preferably of rectangular configuration when viewed in plan and elevation. Depending from a horizontal uppermost or top wall 12 are a pair of storage sub units 14,16, suitably affixed at their upper portion 18 to the undersurface 20 of the top wall 12. The upper surface 22 of the top wall 12 will be understood to define a cutting board, usable by the fisherman to clean their catch, without having to provide a separate device or, using a boat seat or dock planking to perform this chore. Accordingly, the material of the top wall upper surface 22 may be constructed of any suitable composition lending itself to this purpose, such as oak or maple wood or a plastics material as often employed in kitchen cutting boards. As will be apparent from the drawings, the ends 24,24 of the housing top wall 12 extend, at least laterally, to project beyond the outside walls 26 of the sub units 14,16 so as to provide a pair of endmost extensions 28,28. In this manner, hand holds will be seen to be provided whereby the housing 10 may be conveniently lifted and transported, although additional alternate carrying means are provided as will become apparent hereinafter.

Each of the two storage sub units 14,16 is bounded on their opposing faces by an inside wall 30 while a rear wall 32 spans the entire rear of the housing 10 and a bottom wall 34 covers the underside of the two storage subunits 14,16 and preferably spans the entire lowest portion of the housing 10. Each of the storage sub units 14,16 will be seen to comprise an array of vertically stacked storage trays or drawers, with each vertically adjacent two trays being separated by suitable guide elements such as the illustrated horizontal dividers 36. Optionally, well known guide rail members (not shown) may be attached to the opposed inside and outside walls 30 and 26, respectively.

The plurality of drawers are preferably of varying height dimensions, for the obvious intention of serving for the storage of diverse fishing tackle. Accordingly, the right hand sub unit 16 will be seen to include a series of small sized drawers 38 stacked above a plurality of intermediate sized drawers 40. On the other hand, the left hand sub unit 14 is provided with a plurality of small sized drawers 38 atop a single large sized drawer 42. The exact size and number of drawers is optional but, by offering a mixture of alternate sizes, the various types of fishing tackle may be most readily accommodated. Any or all of the drawers 38,40,42 may be fitted with vertical partitions 44 as shown in the opened drawer 38 of FIG. 2, to form isolated compartments 46 in order to maintain separation of the numerous sizes and types of stored tackle items. For example, the small drawers 38 may be used to store fishing hooks of varying types and sizes, sinkers and the like while the intermediate sized drawers 40 may serve to contain floats, lures and the numerous types of artificial bait items. The remaining large sized drawer(s) 42 may then be used to store extra reels, spools of fishing line, etc. With the above in mind, it will be appreciated that an orderly storage system is provided whereby each size and type of tackle element is retained in specific compartments of individual ones of the plurality of drawers. Since the various walls and drawers of the housing 10 are constructed of a stable or hardened composition, it follows that all of the stored tackle items are thusly protected and not squashed or otherwise damaged, as can be the case when one uses a soft pack tackle apparatus.

Each of the respective drawer fronts 48 is provided with a knob 50 or other suitable finger grasping formation to allow ready opening and closing thereof. Also, to preclude the accidental, unwanted opening of any of the drawers 38,40,42, such as during transport of the tackle box 10 or during use in a pitching boat, a locking element 52 is provided for each sub unit 14 and 16. A single one of such elements 52 is supplied for each sub unit and will be seen to simultaneously retain all of the drawers of each sub unit in the closed position. The locking element 52 preferably comprises a relatively stiff elongated member pivotally attached to the front edge 54 of each housing outside wall 26 and which is movable to a blocking position overlying at least a small portion of all of the drawer fronts 48 of the respective sub unit. When disposed in this blocking position, the locking element 52 may be secured by means of a suitable sliding lock catch 56.

The space 58 or cavity between the two storage sub units 14,16 provides an area serving to accommodate a removable container, such as a waterproof live bait or fish catch bucket or receptacle 60. The lower area of the front of the housing 10 between the sub units includes a connecting panel 62 serving to retain the lower portion of the inserted bucket 60 while an inwardly displaceable bucket catch 64 in the top wall 12 assists in stabilizing the upper portion of the bucket. Access to the contents of the inserted bucket 60 is readily achieved by means of a pivotal door 66 in the top wall 12.

To allow quick access to a cleaning knife, a slot 68 adapted to accept an appropriate knife (not shown) is formed through the housing top wall 12, adjacent one top wall end 24 and the rear wall 32. In this manner, a cleaning knife sheathed within the confines of the housing beneath the slot 68 is easily grasped by one's right hand while a fish to be cleaned is held upon the cutting or work surface 22 by the left hand. Additionally, by locating the knife slot 68 in this position, an inserted knife blade will be understood to be clear of the sides of any storage drawers 38 in this area of the tackle box 10.

Figure 2:
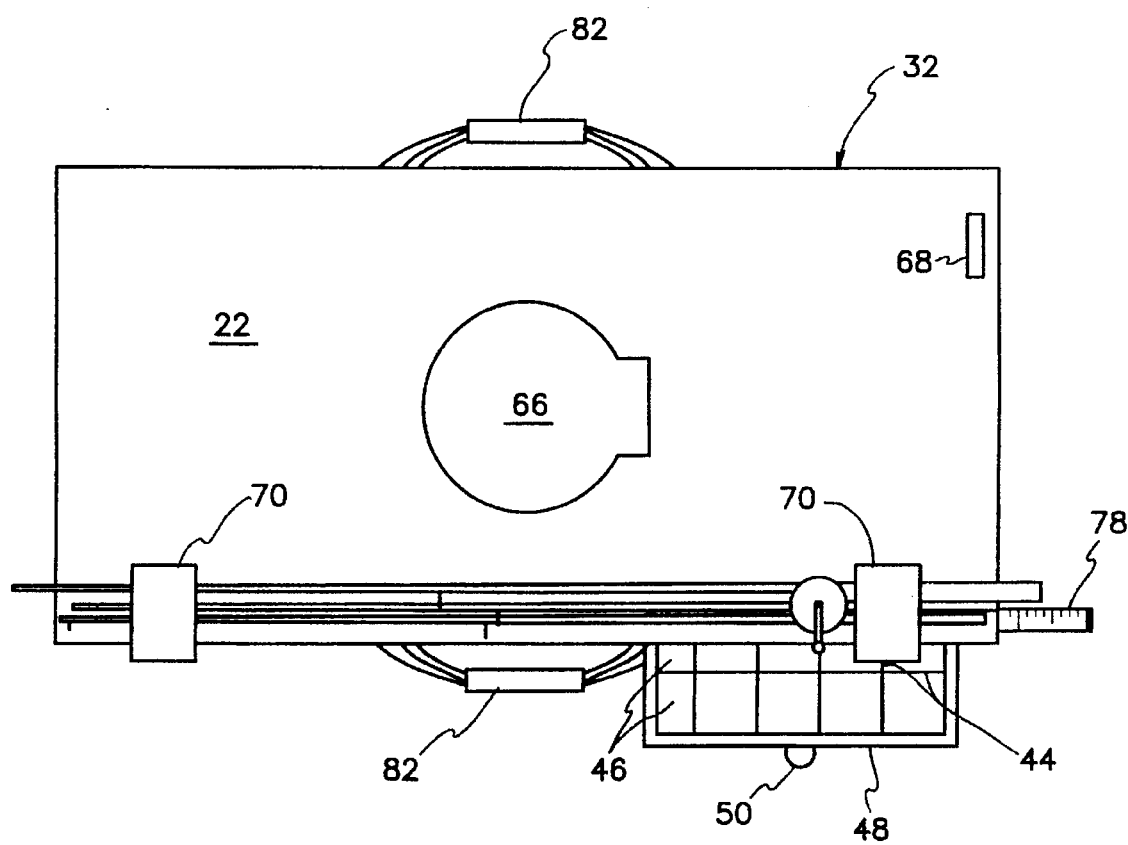
FIG. 2 is a top plan view of the uppermost cutting board, with a collapsed fishing rod attached thereto and illustrating a typical compartmented storage drawer and the auxiliary measuring tape in the extended position.

The transport of larger, elongated tackle items often presents problems but with the current apparatus, such items are readily accommodated exteriorly of the housing 10 by means of a pair of laterally spaced apart releasable straps or loops 70,70. Preferably, VELCRO material is employed for the straps while mating VELCRO material is used to provide adjacent anchor tabs 72,72 affixed to the cutting board surface 22. The straps 70 are affixed to the front edge 74 of the housing top wall 12 and after wrapping about the desired elongated items, are secured by engagement with the anchor tabs 72 as shown in FIG. 2. With this arrangement, various tackle items such as fishing rods, gaffs, and nets may be disassembled, secured by the straps 70 and readily transported as a part of the tackle box 10.

As every fisherman knows, the size of any catch is always important, either to determine if a catch meets the minimum length requirement or, to record what may be a trophy catch, particularly when engaged in a fishing tournament. Accordingly, the top wall 12 will be seen to include a fixed, flush mounted ruler or measuring tape 76 affixed adjacent the front edge 74 and which may extend longitudinally the full length of the top wall. Additionally, to accommodate any catch exceeding the length of the tape 76, a retractable, flexible measuring tape or rule 78 will be seen to be provided juxtaposed the right end 80 of the fixed ruler 76. With this device, longer fish may be measured by withdrawing or extending the flexible tape 78.

As previously described, the tackle box may be carried by using both hands to grasp the two endmost extensions 28,28 of the top wall 12. Alternatively, one handed carrying of the housing 10 is possible through the use of a pair of shiftable handles 82,82, respectively attached to the top wall front edge 74 and rear edge 84. These handles normally repose in a lowered position contiguous with the front of the housing 10 but when lifted upwardly, may be grasped with either one or both hands above the top wall 12.

It will be understood that the present invention is not limited to the embodiments described hereinabove, but encompasses any and all embodiments within the scope of the appended claims.

We claim:
1. A fishing tackle apparatus including;
   a top wall provided with an undersurface,
   a pair of storage sub units depending from said top wall and fixed relative said undersurface, said sub units defining a front face adjacent said top wall,
   a plurality of storage elements in each said sub unit accessible from said front face,
   a cavity disposed intermediate said sub units and beneath said top wall,
   a receptacle removably insertable within said cavity through an opening in said front face,
   a displaceable door in said top wall shiftable to allow access to said receptacle, and
   a stationary measuring tape affixed to said top wall.
2. A fishing tackle apparatus according to claim 1 wherein;
   said top wall includes a slot adapted to receive a cleaning knife.
3. A fishing tackle apparatus according to claim 2 wherein;
   said top wall includes front and rear edges bounded by opposite ends and
   said knife receiving slot is juxtaposed one said top wall end.
4. A fishing tackle apparatus according to claim 1 wherein;
   said top wall includes opposite front and rear edges, and
   shiftable handles mounted on said front and rear edges manipulable to permit one handed carrying of said fishing tackle apparatus.
5. A fishing tackle apparatus according to claim 4 wherein;
   said sub units define a rear face opposite said front face and
   said handles are shiftable from an at rest position substantially contiguous with said front and rear faces to a carrying position above said top wall.
6. A fishing tackle apparatus according to claim 1 wherein;
   said storage elements include horizontally shiftable drawers.
7. A fishing tackle apparatus according to claim 6 wherein;
   said drawers define varying heights and within each said sub unit are vertically arrayed and
   at least one partition within at least one of said drawers to provide a plurality of separate compartments.
8. A fishing tackle apparatus according to claim 6 including;
   a shiftable locking element displaceable to a position overlying said drawers within each said sub unit and
   a lock catch adjacent each said locking element displaceable to retain said locking element in said overlying position.
9. A fishing tackle apparatus according to claim 1 wherein;
   said top wall and sub units are fabricated of dimensionally stable material.
10. A fishing tackle apparatus according to claim 1 including;
    a pair of spaced apart straps on said top wall manipulable to releaseably secure an elongated member to said fishing tackle apparatus.
11. A fishing tackle apparatus according to claim 10 wherein;
    said straps include VELCRO fabric.
12. A fishing tackle apparatus according to claim 1 including;
    an extensible tape measure mounted within said top wall and having an exposed pull tab.
13. A fishing tackle apparatus according to claim 12 wherein;
    said extensible tape measure is axially aligned with said stationary measuring tape.

\* \* \* \* \*